July 18, 1939.                W. G. CLARK                2,166,207
                           ORE REDUCTION PROCESS
                            Filed Sept. 8, 1937
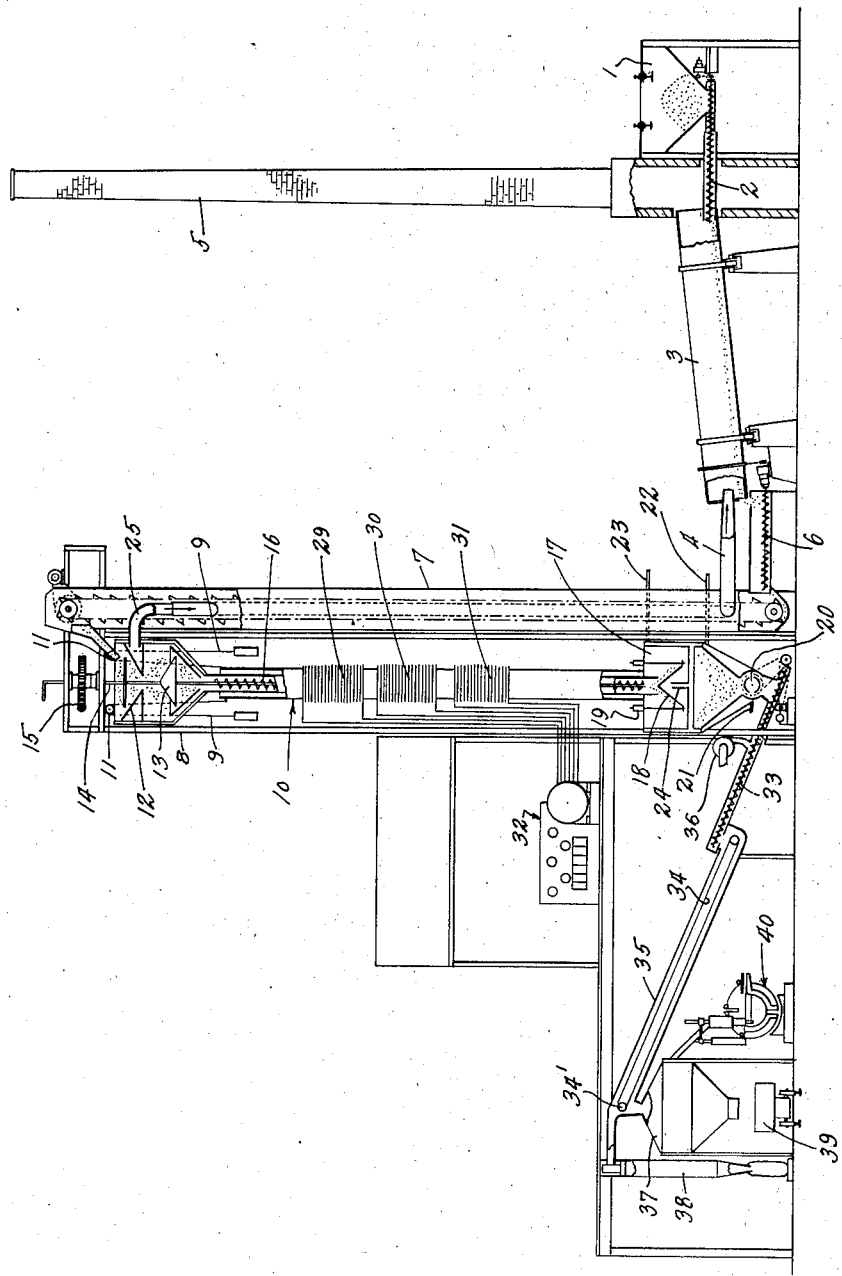
Inventor
Walter Gordon Clark
By Lyon & Lyon
Attorneys Patented July 18, 1939

2,166,207

UNITED STATES PATENT OFFICE 2,166,207

ORE REDUCTION PROCESS

Walter Gordon Clark, Los Angeles, Calif., assignor to Clarkiron, Inc., Los Angeles, Calif., a corporation of Nevada Application September 8, 1937, Serial No. 162,901

11 Claims. (Cl. 75—11)

This invention relates to a continuous method of reducing ores, in which method a reducing gas is employed. The invention particularly relates to the reduction of metallic ores in relatively finely divided form, which can not be ordinarily successfully reduced by existing methods. Various ores may be treated in accordance with this process, iron, chrome, nickel, vanadium and titanium ores being illustrative of types which can and have been successfully treated.

In the reduction of ores such as the metallic oxide ores, attempts have been made to pass heated gases upwardly through a kiln or furnace continuously supplied with fresh ore at the top, the reduced ore being removed from the bottom. Such operation has not been successful because during reduction the particles of ore become sticky and adhere to the walls of the furnace and to each other, bridging the furnace and thereby preventing continuous or any downward movement of the ore. After a furnace has been plugged up in this manner, the only remaining alternative requires termination of the operation, followed by a lengthy and expensive cleaning process.

Heretofore it has been believed that effective reduction of metallic oxide ores in gas took place only within a very narrow range of temperatures, active reduction of iron ore, such as hematite, apparently taking place between about 1650° F. and 1700° F. At temperatures of around 1700° F. and slightly thereabove the ore particles became sticky and the tenacious coherence of the particles to each other and adherence of the particles to the walls of the furnace rendered operations impossible without the admixture of carbon or some inert spacing material.

Moreover, various forms of iron ore such as, for example, the various forms of hematite, require different time-temperature conditions in order to cause effective reduction. Certain of the forms of hematite are very dense and the hematite occurs in conjunction with a siliceous matrix. Other forms, such as those containing limonite, have appreciable contents of water of crystallization and this obviously has to be removed before reduction can take place.

Moreover, the prior methods of ore reduction in gas required or necessitated the use of pure hydrogen or previously purified and separately produced reducing gases. The present invention permits the use of a natural gas or a mixture of gases containing ethane, methane, ethylene, etc., the ore itself being utilized in breaking up the gas to form hydrogen, the hydrogen being then used in reducing the ore.

When gases (such as natural or artificial gas) containing hydrocarbons such as those mentioned hereinabove are used as a reducing agent, carbon is formed when the hydrocarbon compounds are broken down. Heretofore it has been thought impossible to produce a substantially carbon-free metal, this assumption being based upon the fact that carbon is formed from the hydrocarbon gases.

The present invention is in part based upon the discovery that by careful regulation of temperatures as hereinabove described, the absorption of the carbon into the reduced iron may be avoided and the further discovery that the dissociation of the hydrocarbon compounds is actually facilitated by the reduced ore which appears to act as a catalyst in breaking the hydrocarbon gas. Furthermore, the method of this invention comprises a novel method of removing and separating from the reduced ore any carbon which is mixed therewith and which has been formed during the process.

It is an object of this invention, therefore, to disclose and provide a method of reducing metallic oxide ores by the use of gases containing hydrocarbon compounds, these compounds being broken down so as to release hydrogen while in contact with the ore being reduced.

Another object of the invention is to provide a method of reducing metallic oxide ores by the use of hydrocarbon gases containing methane, ethane, and the like, hydrogen for reduction being derived from these hydrocarbon constituents of the gas and the reduced ore acting as a catalyst to facilitate dissociation of the hydrocarbon gases.

A further object of the invention is to provide a continuous process of reducing metallic oxide ores by means of gases which are dissociated in the presence of the ore to form reducing gases and carbon and in regulating the temperature of the process whereby absorption of the carbon into the reduced ore is minimized, whereupon the carbon may be separated from the reduced ore, leaving a substantially carbon-free product.

These and other objects, advantages, uses and modifications of the invention will become apparent from the subsequent description of a form of apparatus and preferred methods of procedure.

The present application is a continuation-in-part of an application entitled "Ore reduction process and apparatus therefore", Serial No. 58,685, filed January 11, 1936. A form of apparatus suitable for use in the process of this invention is described in said application. A slightly modified form of apparatus is shown in the drawing forming a part of this application and in the subsequent detailed description of this invention reference will be had to said drawing, in which:

The figure is a diagrammatic representation in side elevation and partly in section of one form and arrangement of apparatus which can be employed in carrying out the process.

Generally stated, the process of this invention comprises crushing or comminuting the ore, such as a hematite ore, to a suitable state of subdivision. The ore, for example, may be crushed or comminuted so that it passes a ½ inch mesh and is retained on a 10 mesh screen, or it may pass a ¼ inch mesh and be retained on a 20 mesh sieve. It is to be remembered that the rather finely divided ores heretofore incapable of being reduced economically may be handled by this process. This ore may then be dried or dehydrated in any suitable manner and then fed into a vertical cylinder surrounded with a plurality of separate induction coils adapted to heat the cylinder and its contents. The vertical cylinder is preferably of metal and is provided with an internal spiral by means of which the rapidity of movement of the material downwardly through the cylinder may be regulated so that the progress of the ore downwardly is controlled.

A suitable gas substantially free of oxygen or air is passed upwardly countercurrent to the ore. The use of pure hydrogen or previously and separately produced hydrogen is not essential since it has been found that natural gas (gas obtained from natural wells and containing hydrogen, ethane, methane, ethylene and the like) can be utilized. Any mixture of gases substantially free from oxygen and containing hydrocarbon constituents capable of being dissociated to form carbon and hydrogen can be used. Carbon dioxide may be present but acts as a diluent.

Any gas, therefore, of the character stated, is passed upwardly through the column in intimate contact with the downwardly moving ore. It has been found that reduced ore when at a high temperature acts as a catalyst and facilitates the dissociation or breakdown of the lighter hydrocarbons such as ethane and methane. The hot nascent and recently dissociated gases obviously contact with freshly admitted ore since these gases have been heated in the lower or high temperature zone of the column. As a result, the iron oxide ore is first reduced from ferric condition to a ferrosoferric condition (magnatite) and thereafter as higher temperatures are reached the iron ore is reduced to the ferrous form and finally to metallic iron.

The carbon which is liberated during breaking of the gases is deposited loosely upon the reduced iron and after the iron with its carbon is cooled it is treated in a suitable manner for the removal and separation of the carbon from the iron. One preferred method of accomplishing this result comprises scrubbing the reduced iron with a gaseous fluid so as to form a suspension of carbon in the fluid. The reduced iron may then be melted in any suitable manner, preferably electrically, to produce substantially carbon-free iron. The gaseous medium containing the suspended carbon may then be sent through suitable collectors and separators for the purpose of recovering a finely divided carbon which may be used in lieu of many grades of carbon black.

Before discussing the process in detail, the diagrammatic representation shown in the drawing will be described. The ore after having been granulated and screened to a desired fineness of division, an appropriate range of particle sizes may be fed from a hopper 1 as by means of a scroll feeder 2 into a rotating drying drum 3, heated at its lower end by means of a burner or hot gases discharged by line 4, the spent gases being then sent up the stack 5. The substantially dry granular ore is then moved by means of a scroll feeder or other conveyor 6 into an elevator 7 and discharged by said elevator into the upper end of the main heating and reducing apparatus 10. Such apparatus may be in the form of a vertical hollow cylinder of joined or segmental design from a frame or tower 8 as by means of cable 9 passing over sheaves 11, one end of the cable 9 being attached to the upper end of the apparatus 10 whereas the other end is provided with suitable counterweights. In this manner, longitudinal expansion of the apparatus 10 is permitted to take place, the lower portion of the apparatus being firmly connected to the main frame 8.

The elevator 7 discharges the granular ore through a substantially gas-tight series of traps or inverted bells indicated at 12 and 13. Extending axially down through the main heating and reducing apparatus 10 is a rotating hollow shaft 14 regulatably driven by suitable means located at the top of the frame-work 8 and generally indicated at 15. That portion of the hollow shaft 14 which extends through the heating and reducing apparatus 10 is provided with a spiral 16 by means of which the ore may be regulatably and progressively moved downwardly through the apparatus 10. At the lower end of the apparatus 10 is provided a substantially air-tight cooling chamber 17 containing an inverted cone 18 which may be adjustably positioned below the outlet of the apparatus 10, adjustment means being generally indicated at 19. The cooling chamber 17 has a substantially air-tight discharge valve 20. The lower portion of the cooling chamber may be in the form of a double-walled hopper through which cooling water may be circulated as by means of the lines 21—22. The upper portion of the cooling chamber may be double walled and natural gas admitted thereto by means of line 23. Gas can then be discharged from the chamber formed by the double walls of the cooler 17 upwardly beneath the cone 18 as by line 24.

In this manner the down-coming reduced ore is brought into intimate contact with natural gas and the gas then moves upwardly through the heating apparatus 10 countercurrent to the downward movement of the ore. The gases and water vapor, etc., may be discharged from the upper or feeding chamber of the apparatus as by line 25 into the enclosed elevator 7 and then pass out of the elevator as by line 4. The gases thus discharged by line 4 into the drier 3 may be mixed with additional gas or air for the purpose of insuring combustion and generating sufficient heat in the drier 3 to suitably preheat and dry the ore.

The main vertical cylinder of the apparatus 10 is heated by induction coils, such as the coils 29, 30 and 31. These coils may be adjustably positionable along the length of the apparatus 10 and are supplied with power from a suitable source, generally indicated at 32.

The reduced ore, together with carbon deposited thereon, is discharged by the valve 20 and moved as by a spiral feeder 33 onto an inclined continuous conveyor 34 within a housing 35. Air supplied by a blower 36 moves in the same direction as the ore upwardly through the housing of the scroll feeder and conveyor 34. The continuous conveyor 34 may pass over a magnetic pulley 34' for the purpose of facilitating the discharge of the ore into a hopper or bin 37. The air or other gaseous fluid used within the housing 35 is discharged into a suitable cyclone, bag collector, or other device adapted to separate carbon from the gas, such form of separator being indicated at 38. The ore from the hopper 37 may be taken for further processing by means of cars 39 or it may be discharged into the electric furnace, generally indicated at 40, wherein it can be reduced to liquid form and then cast.

In the operation of the process it is to be noted that granular spacing material, such as carbon or the like, is not used in admixture with the ore for the purpose of preventing sticking or clogging of the apparatus. For this reason, subsequent treatment of the ore is greatly simplified. Moreover, the reduction is accomplished by the use of natural gas and it is not necessary to install or operate additional expensive hydrogen generators, auxiliary gas cracking plants, purifiers, etc.

The process which takes place in the heating and reducing apparatus 10 may be divided into three stages. When iron ore is being reduced the first stage of the process (including temperatures below about 400° C.–450° C.) is used in converting the surface of the particles to the various intermediate oxides such as $FeO$, $Fe_2O$, $Fe_2O_3$ and $Fe_3O_4$. This first stage of the process may also include temperatures ranging up to about 600° C. and the particles of ore subjected to temperatures of say 400° C.–600° C. will be found to have a metalized or reduced surface. In other words, the factors of time, temperature and hydrogen content in the gases employed during this first stage of the process and at temperatures below about 600° C. are directed to form reduced surfaces on the particles of the ore. In the second stage of the process, which may be said to include a temperature range of from about 550–600° C. to 950° C., the conditions of time, temperature and hydrogen content in the gas are regulated so as to slowly reduce the interior portions of each particle of ore, the rate at which the particles are heated being controlled so that the mixture of oxides contained in these particles (which mixture has a relatively low melting point) will not be reduced to molten condition and be permitted to exude from the particles and break through the surface film of metal. It has been found that by regulating the various factors, including rate of travel of the ore through the apparatus, the interior portions may be reduced without permitting the mixtures of oxides to melt and form liquid beads on the surface of the particles. It has been found that in the event the liquid oxides exude from the particles, they will cause adherence to the walls of the reducing chamber and coherence between particles, thereby bridging and clogging the apparatus, and such effect should be avoided.

In the third or high temperature stage of the process, temperatures in excess of 900° C. or 950° C. may be used and these temperatures may be as high as 1200° C. As soon as a sufficiently thick, metalized coating is formed on the particles, the temperatures may be rapidly boosted to insure thorough reduction of each particle of ore.

It is to be noted that numerous methods of controlling this process have been provided. The rate at which the ore is moved downwardly is regulated by the spiral feeder. Temperatures within the spiral feeder may be accurately controlled by the use of the induction coils, such as the coils 29, 30 and 31. The coils, furthermore, may be moved along the tube or furnace 10 so as to vary the temperatures along different portions of the apparatus. Moreover, the coils 29, 30 and 31 may be made of sections which are separable and which may be independently energized or regulated.

Furthermore, the mesh or particle size of the ore may be controlled, thereby effecting the time within which a given particle is brought to a desired temperature. The amount of gas introduced into the apparatus is also controllable. Most of the gas should be introduced at the bottom and through the lines 23 and 24 but a desired proportion of gas may be admitted through the hollow shaft 14 and discharged into the ore just before the ore is discharged into the cooler 17. This secondary injection of gas is desirable in that it maintains the temperature of the hollow shaft 14 within a reasonably low range. The amount of natural gas introduced into the process should be controlled so that not less than one volume of hydrogen to one volume of water vapor exists in the upper portion of the apparatus, i. e., in that portion in which temperatures of say 400° C. exist. Water vapor will obviously be generated by a combination of the hydrogen with some of the oxygen liberated during reduction so that an excess of hydrogen must at all times be present for reducing purposes. A very large excess of hydrogen is present in the higher temperature zones of the apparatus, i. e., in zones in which temperatures of from 600° C. to 1000° C. exist.

As stated hereinbefore, the natural gas contacts freshly reduced ore while such ore is at a temperature of say 900° C.–950° C. or even higher. Freshly reduced hot ore has been found to decompose and break down natural gas almost completely so that only about ½% or less of methane is left as a residue of all the ethylene and ethane and other hydrocarbons originally contained in the gas.

Attention is called to the fact that in the process described the ore is brought into contact with gas containing progressively larger proportions of hydrogen and the ore is simultaneously heated to progressively higher temperatures so that the initial reduction of the surface of the particles takes place rather slowly but a very rapid reduction is attained at temperatures above about 950° C.

When the natural gas comes in contact with the hot freshly reduced ore, the various hydrocarbons present break down into hydrogen and carbon. The carbon which separates from the gas deposits upon the particles of ore in the form of carbon black but since the reduced metal is well below the melting point, little or none of the carbon is absorbed. Adherence or contact between the reduced metal and carbon particles is very light and the contact is not sufficient to bring about carburization.

Ordinarily, the decomposition of hydrocarbons such as methane, ethane, ethylene and aromatics or mixtures thereof, requires very high temperatures on the order of about 2500° C. in order to produce virtually complete breakdown but in the presence of freshly reduced iron as described, virtually complete breakdown is accomplished at temperatures on the order of 950° C. During this break up of gas into hydrogen and carbon, the presence of water vapor appears to be favorable to the decomposition of the gas. After the reduced iron has been exposed to air for a period of time, it does not show the same catalytic action as that obtained during the process described.

The freshly reduced iron with its lightly adhering carbon has a tendency to pick up oxygen at temperatures above about 250° C. and for this reason the iron is preferably cooled in the substantial absence of air to a temperature below about 250° C. and preferably below about 200° C. After the carbon is separated from the iron, however, the iron becomes more resistant to oxidation and may be raised to temperatures above 200° C. or 250° C. without any material oxidation.

In the event iron ores are treated in accordance with the process of this invention, the resulting iron is substantially carbon free, reputable analysts reporting the carbon content as varying from a trace to not more than about 0.008%. It is to be remembered, however, that the process herein described is not limited to the treatment of iron ore since various other metallic oxide ores, such as for example, ores of chrome, nickel, vanadium and titanium can and have been successfully treated.

I claim:

1. A continuous process of reducing metallic iron oxide ores in granular form and in the absence of added spacing material to form metallic iron therefrom, comprising: positively moving iron oxide ore in granular form and at a regulatable rate downwardly through a heating and reducing zone while regulatably heating the ore by induction to progressively increasing temperatures, and discharging the ore into a substantially air-tight cooling zone while said ore is at a temperature of above about 950° C.; introducing natural gas into said cooling zone and decomposing said gas to liberate hydrogen and deposit carbon upon contact with freshly reduced iron ore at above about 950° C.; passing said decomposed and heated gas upwardly through said iron oxide ore in said heating and reducing zone and discharging residual gases from the upper end of said zone; regulating the rate of movement of the ore through said heating and reducing zone and the application of heat in said zone to first reduce the surface of said granular iron ore particles at a temperature below about 600° C. and in the upper portion of said zone, and then reducing the interior of said particles while increasing the temperature thereof at a rate insufficient to cause any iron oxides to break through the surface of the particles of ore; regulating the introduction of natural gas into said cooling zone to maintain a ratio of not less than one volume of hydrogen to one volume of water vapor at the upper portion of said heating zone and a higher ratio of hydrogen in the lower portions of said zone; cooling said reduced ore and carbon deposited thereon in the substantial absence of extraneous air to a temperature below about 200° C.; separating the carbon from the reduced ore by washing the reduced ore with a gaseous fluid to suspend carbon therein; and finally removing the carbon from said gaseous fluid.

2. A continuous process of reducing metallic iron oxide ores in granular form and in the absence of added spacing material to form metallic iron therefrom, comprising: positively moving iron oxide ore in granular form and at a regulatable rate downwardly through a heating and reducing zone while regulatably heating the ore by induction to progressively increasing temperatures, and discharging the ore into a substantially air-tight cooling zone while said ore is at a temperature of above about 950° C.; introducing natural gas into said cooling zone and decomposing said gas to liberate hydrogen and deposit carbon upon contact with freshly reduced iron ore at above about 950° C.; passing said decomposed and heated gas upwardly through said iron oxide ore in said heating and reducing zone and discharging residual gases from the upper end of said zone; regulating the rate of movement of the ore through said heating and reducing zone and the application of heat in said zone to first reduce the surface of said granular iron ore particles at a temperature below about 600° C. and in the upper portion of said zone, and then reducing the interior of said particles while increasing the temperature thereof at a rate insufficient to cause any iron oxides to break through the surface of the particles of ore; cooling said reduced ore and carbon deposited thereon in the substantial absence of extraneous air to a temperature below about 200° C.; separating the carbon from the reduced ore by washing the reduced ore with a gaseous fluid to suspend carbon therein; and finally removing the carbon from said gaseous fluid.

3. A continuous process of reducing metallic iron oxide ores in granular form and in the absence of added spacing material to form metallic iron therefrom, comprising: positively moving iron oxide ore in granular form and at a regulatable rate downwardly through a heating and reducing zone while regulatably heating the ore by induction to progressively increasing temperatures, and discharging the ore into a substantially air-tight cooling zone while said ore is at a temperature of above about 950° C.; introducing natural gas into said cooling zone and decomposing said gas to liberate hydrogen and deposit carbon upon contact with freshly reduced iron ore at above about 950° C.; passing said decomposed and heated gas upwardly through said iron oxide ore in said heating and reducing zone and discharging residual gases from the upper end of said zone; regulating the rate of movement of the ore through said heating and reducing zone and the application of heat in said zone to first reduce the surface of said granular iron ore particles at a temperature below about 600° C. and in the upper portion of said zone, and then reducing the interior of said particles while increasing the temperature thereof at a rate insufficient to cause any iron oxides to break through the surface of the particles of ore; cooling said reduced ore and carbon deposited thereon in the substantial absence of extraneous air to a temperature below about 200° C.

4. A continuous process of reducing metallic iron oxide ores in granular form and in the absence of added spacing material to form metallic iron therefrom, comprising: positively moving iron oxide ore in granular form and at a regulatable rate downwardly through a heating and reducing zone while regulatably heating the ore by induction to progressively increasing temperatures, and discharging the ore into a substantially air-tight cooling zone while said ore is at a temperature of above about 950° C.; introducing natural gas into said cooling zone and decomposing said gas to liberate hydrogen and deposit carbon upon contact with freshly reduced iron ore at above about 950° C.; passing said decomposed and heated gas upwardly through said iron oxide ore in said heating and reducing zone and discharging residual gases from the upper end of said zone; regulating the rate of movement of the ore through said heating and reducing zone and the application of heat in said zone to first reduce the surface of said granular iron ore particles at a temperature below about 600° C. and in the upper portion of said zone, and then reducing the interior of said particles while increasing the temperature thereof at a rate insufficient to cause any iron oxides to break through the surface of the particles of ore.

5. A continuous process of reducing metallic iron oxide ores in granular form and in the absence of added spacing material to form metallic iron therefrom, comprising: positively moving iron oxide ore in granular form and at a regulatable rate downwardly through a heating and reducing zone while regulatably heating the ore by induction to progressively increasing temperatures, and discharging the ore into a substantially air-tight cooling zone while said ore is at a temperature of above about 950° C.; introducing natural gas into said cooling zone and decomposing said gas to liberate hydrogen and deposit carbon upon contact with freshly reduced iron ore at above about 950° C.; passing said decomposed and heated gas upwardly through said iron oxide ore in said heating and reducing zone and discharging residual gases from the upper end of said zone; regulating the rate of movement of the ore through said heating and reducing zone and the application of heat in said zone to first reduce the surface of said granular iron ore particles at a temperature below about 600° C. and in the upper portion of said zone, and then reducing the interior of said particles while increasing the temperature thereof at a rate insufficient to cause an iron oxides to break through the surface of the particles of ore; regulating the introduction of natural gas into said cooling zone to maintain a ratio of not less than one volume of hydrogen to one volume of water vapor at the upper portion of said heating zone and a higher ratio of hydrogen in the lower portions of said zone; cooling said reduced ore and carbon deposited thereon in the substantial absence of extraneous air to a temperature below about 200° C 6. A continuous process of reducing metallic oxide ores in granular form and in the absence of added spacing material, comprising: positively moving a metallic oxide ore in granular form and at a regulatable rate through a heating and reducing zone while regulatably heating the ore by induction to progressively increasing temperatures, and discharging the ore into a substantially airtight cooling zone while said ore is at a temperature of above about 950° C.; introducing hydrocarbon gas into said cooling zone, and decomposing said gas to liberate hydrogen and deposit carbon upon contact with freshly reduced ore at above about 950° C.; passing said decomposed and heated gas through said ore in said heating and reducing zone countercurrent to the movement of the ore; regulating the rate of movement of the ore through said heating and reducing zone and the application of heat in said zone to first reduce the surface of said granular ore particles at a temperature below about 600° C. in one portion of said zone; and then reducing the interior of said particles while increasing the temperature thereof at a rate insufficient to cause liquefied oxides to break through the surface of the particles of ore.

7. A continuous process of reducing metallic oxide ores in granular form and in the absence of added spacing material, comprising: positively moving a metallic oxide ore in granular form and at a regulatable rate through a heating and reducing zone while regulatably heating the ore by induction to progressively increasing temperatures, and discharging the ore into a substantially airtight cooling zone while said ore is at a temperature of above about 950° C.; introducing hydrocarbon gas into said cooling zone, and decomposing said gas to liberate hydrogen and deposit carbon upon contact with freshly reduced ore at above about 950° C.; passing said decomposed and heated gas through said ore in said heating and reducing zone countercurrent to the movement of the ore; regulating the rate of movement of the ore through said heating and reducing zone and the application of heat in said zone to first reduce the surface of said granular ore particles at a temperature below about 600° C. in one portion of said zone; and then reducing the interior of said particles while increasing the temperature thereof at a rate insufficient to cause liquefied oxides to break through the surface of the particles of ore; and regulating the introduction of gas into said cooling zone to maintain a ratio of not less than one volume of hydrogen to one volume of water vapor in the lower temperature section of said heating zone, and a higher ratio of hydrogen to water vapor in the higher temperature sections of such zone.

8. A continuous process of reducing metallic oxide ores in granular form and in the absence of added spacing material, comprising: positively moving a metallic oxide ore in granular form and at a regulatable rate through a heating and reducing zone while regulatably heating the ore by induction to progressively increasing temperatures, and discharging the ore into a substantially air-tight cooling zone while said ore is at a temperature of above about 950° C.; introducing hydrocarbon gas into said cooling zone, and decomposing said gas to liberate hydrogen and deposit carbon upon contact with freshly reduced ore at above about 950° C.; passing said decomposed and heated gas through said ore in said heating and reducing zone countercurrent to the movement of the ore; regulating the rate of movement of the ore through said heating and reducing zone and the application of heat in said zone to first reduce the surface of said granular ore particles at a temperature below about 600° C. in one portion of said zone; then reducing the interior of said particles while increasing the temperature thereof at a rate insufficient to cause liquefied oxides to break through the surface of the particles of ore; regulating the introduction of hydrocarbon gas into said cooling zone to maintain a ratio of not less than one volume of hydrogen to one volume of water vapor in the lower temperature section of said heating zone, and a higher ratio of hydrogen to water vapor in the higher temperature sections of such zone; and cooling said reduced ore and carbon deposited thereon in the substantial absence of extraneous air to a temperature below about 200° C.

9. A continuous process of reducing metallic oxide ores in granular form and in the absence of added spacing material, comprising: positively moving a metallic oxide ore in granular form and at a regulatable rate through a heating and reducing zone while regulatably heating the ore by induction to progressively increasing temperatures, and discharging the ore into a substantially airtight cooling zone while said ore is at a temperature of above about 950° C.; introducing hydrocarbon gas into said cooling zone, and decomposing said gas to liberate hydrogen and deposit carbon upon contact with freshly reduced ore at above about 950° C.; passing said decomposed and heated gas through said ore in said heating and reducing zone countercurrent to the movement of the ore; regulating the rate of movement of the ore through said heating and reducing zone and the application of heat in said zone to first reduce the surface of said granular ore particles at a temperature below about 600 C. in one portion of said zone; then reducing the interior of said particles while increasing the temperature thereof at a rate insufficient to cause liquefied oxides to break through the surface of the particles of ore; and then separating the carbon from the reduced and cooled ore by washing the reduced ore with a fluid to suspend carbon therein.

10. A continuous process of reducing metallic oxide ores in granular form and in the absence of added spacing material, comprising: positively moving a metallic oxide ore in granular form and at a regulatable rate through a heating and reducing zone while regulatably heating the ore by induction to progressively increasing temperatures, and discharging the ore into a substantially airtight cooling zone while said ore is at a temperature of above about 950° C.; introducing natural gas into said cooling zone, and decomposing said gas to liberate hydrogen and deposit carbon upon contact with freshly reduced ore at above about 950° C.; passing said decomposed and heated gas through said ore in said heating and reducing zone countercurrent to the movement of the ore; regulating the rate of movement of the ore through said heating and reducing zone and the application of heat in said zone to first reduce the surface of said granular ore particles at a temperature below about 600° C. in one portion of said zone; then reducing the interior of said particles while increasing the temperature thereof at a rate insufficient to cause liquefied oxides to break through the surface of the particles of ore; regulating the introduction of natural gas into said cooling zone to maintain a ratio of not less than one volume of hydrogen to one volume of water vapor in the lower temperature section of said heating zone, and a higher ratio of hydrogen to water vapor in the higher temperature sections of such zone; cooling said reduced ore and carbon deposited thereon in the substantial absence of extraneous air to a temperature below about 200° C.; and then separating the carbon from the reduced and cooled ore by washing the reduced ore with a fluid to suspend carbon therein.

11. A process comprising contacting natural gas with freshly reduced, granular iron oxide ore while said reduced ore is at a temperature of about 950° C. or thereabove to decompose said gas and deposit carbon on the reduced ore; cooling the reduced ore and carbon adhering thereto to a temperature below about 250° C., and then separating the ore from the carbon by washing the same with a fluid to form a carbon suspension, and separately removing carbon from said suspension.

WALTER GORDON CLARK.